3,445,311
BONDING OF PLASTIC MATERIALS BY POLYMERIZABLE SOLVENTS

Robert P. Cox and Ralph W. Buetow, Madison, Wis., assignors to Celanese Corporation, a corporation of Delaware
No Drawing. Filed Oct. 28, 1964, Ser. No. 407,221
Int. Cl. C09j *5/02;* B32b *23/20*
U.S. Cl. 156—307     13 Claims

ABSTRACT OF THE DISCLOSURE

The process for bonding cellulose ester, e.g., cellulose acetate, sheets together by applying to at least one of the mating sheet surfaces a monomeric polymerizable ketone which is a swelling agent or, preferably, a solvent for the cellulose ester and applying to at least one of the mating surfaces a polymerization catalyst, e.g., a quaternary ammonium base, for the ketone and subsequently polymerizing the ketone in situ. The laminated cellulose ester product is suitable for use in eyeglass frames.

---

This invention relates to the bonding of plastic materials, and it particularly relates to the bonding of thermoplastic cellulose acetate sheets at relatively low temperatures and pressures.

Heretofore, the bonding together of cellulose acetate sheets was generally effected by the application of an adhesive material between the surfaces to be bonded followed by the application of elevated temperatures and pressures to achieve the bond. However, this type of process not only required an undue amount of care and skill as well as expense because of the necessity of operating under carefully controlled temperature and pressure conditions, but also often resulted in warping at the bonded surfaces. On the other hand, when it was heretofore proposed to obtain the bonding under relatively low temperatures and pressures, the adherence was often ineffective and resulted in easy peeling.

It has been found that active solvents for the thermoplastics, such as methyl ethyl ketone, ethyl acetate and methyl Cellosolve acetate, yield good bonds between smooth cellulose acetate sheets with satisfactory bond impact and peel strengths. However, unless great care is used in the process, severe warpage of the sheets occurs. Furthermore, if any of the mating surfaces of the sheets are embossed, the problem becomes even greater because unless extreme care is used (a) if the solvent and the laminate are assembled immediately under slight pressure, only the tops of the embossed grooves are bonded, the design being retained but the bond being composed of a honeycomb of air channels; (b) if the solvent is applied and allowed to penetrate prior to assembly, the design is warped or destroyed, depending on the pressure used; or (c) if too much solvent is used, the thin embossed sheet wrinkles and, in some cases, the embossed design "inverts" and is present on the outer surface of the sheet.

It is, therefore, an object of the present invention to provide a method and means for bonding cellulose acetate sheets by the use of solvents wherein the above and other disadvantages are overcome.

Another object of the present invention is to obtain a bonded cellulose acetate laminate wherein the bond is free of the aforementioned defects.

Other objects and many of the attendant advantages of the present invention will be readily appreciated as the same becomes better understood by reference to the following detailed description and claims.

In accordance with one aspect of this invention, the cellulose acetate sheets are bonded by the application of a polymerizable ketone which is a solvent for the cellulose acetate, followed by polymerization of said solvent. In a preferred embodiment the solvent is polymerized by means of a rapidly acting catalyst, such as an ionic polymerization catalyst.

In one method of treatment, the monomeric solvent may be applied on one mating surface while the other mating surface is lightly coated with the catalyst. Immediately upon assembling at room temperature, an excellent bond is established. In another and preferable method, the mating surfaces are first immersed in a solution of the catalyst. These surfaces are then dried and assembled with the monomeric solvent in between. The laminate may then be cured at relatively moderate temperatures and pressures. Contact pressure and room temperature may be employed with very good results. If desired higher pressures (e.g., 50 p.s.i.) and temperatures (e.g., 60 or 90° C.) may be used.

The sheets to be bonded may be of any suitable thickness as for example from as little as 5 mils to as much as 250 mils, or more. The bonding of a large number of sheets into a single laminate structure may be achieved by successive or simultaneous bonding. The latter is preferred since it minimizes the opportunity for distortion.

In a preferred embodiment of this invention, one of the sheets has a pigmented or an embossed surface and the other is a clear, transparent sheet. The depth of embossing is generally up to about 20 mils (0.02 inch), e.g., in the range of about 2 to 20 mils. In the process the adhesive fills the depressions in the embossed surface. Often the embossed sheet is relatively thin, e.g., about 20–40 mils in thickness, and the other sheet, to which it is laminated and which serves as the base sheet, is thicker, e.g., 120–180 mils.

The acetyl content of the cellulose acetate sheets to be bonded is usually in the range of about 50% to about 62.5%, calculated as acetic acid. Plasticizers, such as triphenyl phosphate, dimethoxyethyl phthalate, diethylphthalate, and triethyl phosphate or other ester plasticizers are usually present in the sheets, e.g., in amounts between 10 and 35 weight percent, based on the total weight of the sheet.

The preferred polymerizable ketone used in the practice of this invention is methyl vinyl ketone, which although relatively stable may, we have found, be rapidly polymerized by contact with a quaternary ammonium base. It is preferred that the ketone contain ethylenic unsaturation and be a swelling agent, preferably a solvent, for the cellulose acetate. Examples of other ketones which may be employed are alkyl alkenyl ketones such as ethyl vinyl ketone, butyl vinyl ketone and methyl isopropenyl ketone.

The preferred catalysts are quaternary ammonium bases. Tetraethylammonium hydroxide has been found to be very suitable. Examples of other quaternary ammonium bases are other tetraalkyl ammonium hydroxides, e.g., tetramethyl and tetrabutyl ammonium hydroxide, or quaternary ammonium bases containing aryl or aralkyl groups, e.g., benzyl trimethyl ammonium hydroxide. Other catalysts for the polymerization of ketones, well known in the art, may be used, e.g., free-radical catalysts such as the peroxides, e.g., benzoyl peroxide, cumyl peroxide, persulfates, etc.

In the practice of this invention, it is preferred to apply only a small amount of the monomer to the surfaces to be bonded, e.g., an amount sufficient to uniformly wet these surfaces. When one or both of the surfaces is embossed it is desirable to use sufficient monomer to fill the depressions in the embossed surfaces. Preferably, the monomer and catalyst are such as to give a clear transparent bond.

The monomer may be diluted, if desired, with a suitable solvent, e.g., a solvent for cellulose acetate such as ethyl acetate or methoxyethyl acetate. It may also contain a thickening agent, such as a dissolved inert high polymer, e.g., cellulose acetate. When these added ingredients are included they are preferably employed in minor proportions (e.g., 10%).

The laminates of this invention are particularly suitable for the manufacture of so-called "optical laminates" which are decorative sheets or strips used in making eyeglass frames. In the production of these eyeglass frames, the laminates are usually punched out to the shape of the front frame of the spectacles. The spectacle ear pieces may be formed similarly. It will be appreciated that such manufacturing operations put a severe strain on the adhesive, and will cause delamination of weak or brittle bonds.

The following example is given to illustrate this invention further:

An embossed cellulose acetate sheet (54.7% acetyl, calculated as acetic acid, plasticized with 18.5% of diethyl phthalate and 7.5% of triphenyl phosphate) and a clear flat sheet of the same material were immersed in a 10% aqueous solution of tetraethyl ammonium hydroxide for one minute at room temperature and then dried, after which methyl vinyl ketone was applied to the embossed surface and to one surface of the flat sheet and these surfaces were brought promptly together. The monomer began to polymerize substantially instantaneously. An excellent bond of very high impact strength was produced, without distortion of the embossed surface.

While the invention finds its greatest utility in the bonding of cellulose acetate sheets, it may also be employed for the bonding of other plastics, particularly for plastics having surfaces which are soluble or swellable by the monomeric ketone. Examples of such plastics are other cellulose esters, such as cellulose organic acid esters, e.g., cellulose propionate, cellulose butyrate, cellulose acetate propionate, cellulose acetate butyrate, as well as plastics with other polymeric backbones, e.g. polyvinyl acetate, polystyrene, poly methyl methacrylate, or polyvinyl chloride.

It is to be understood that the foregoing detailed description is given merely by way of illustration, and that variations may be made therein without departing from the spirit of this invention.

The embodiments of the invention in which an exclusive property or privilege is claimed are defined as follows:

1. In the process for laminating thermoplastic cellulose ester sheets together, the improvement which comprises applying to at least one of the mating surfaces of the sheets a monomeric polymerizable ketone which is a swelling agent for said cellulose ester, applying to at least one of said mating surfaces a quaternary ammonium base compound to catalyze said ketone, bringing said mating surfaces together and polymerizing said ketone in situ.

2. Process of claim 1 wherein said monomeric polymerizable ketone is a solvent for said cellulose ester.

3. Process of claim 1 wherein said thermoplastic cellulose ester is cellulose acetate.

4. Process of claim 1 wherein said quaternary ammonium compound is tetraethyl ammonium hydroxide.

5. A laminate produced by the process of claim 1.

6. Process of laminating sheets of plasticized cellulose acetate, at least one of said sheets having an embossed surface, which comprises bonding said sheets with a polymerizable monomeric ketone by applying to one of the surfaces to be bonded a quaternary ammonium base compound which is a catalyst for the polymerization of said ketone, depositing said ketone on said embossed surface and in the depressions thereof, said ketone being a solvent for cellulose acetate, and assembling said sheets together at said surfaces and polymerizing said ketone in situ.

7. Process as set forth in claim 6 in which the ketone is methyl vinyl ketone.

8. A laminate produced by the process of claim 6.

9. The process for laminating cellulose acetate sheets together comprising immersing the mating surfaces of said cellulose acetate sheets into a solution of a quaternary ammonium base catalyst, drying said surfaces, applying a monomeric polymerizable ketone which is a solvent for said cellulose acetate to said surfaces, assembling said sheets together at said surfaces and polymerizing said ketone in situ.

10. Process for laminating cellulose acetate sheets which comprises applying tetraethylammonium hydroxide to at least one of the mating surfaces of the sheets, applying methyl vinyl ketone to at least one of said mating surfaces and assembling said sheets together at said surfaces.

11. A laminate produced by the process of claim 10.

12. Process which comprises polymerizing an alkenyl alkyl ketone, having its ethylenic unsaturation in terminal position, in contact with a quaternary ammonium base.

13. Process which comprises polymerizing methyl vinyl ketone in contact with tetraethylammonium hydroxide.

References Cited

UNITED STATES PATENTS

| | | | |
|---|---|---|---|
| 2,088,577 | 8/1937 | Conaway | 161—251 X |
| 2,489,145 | 11/1949 | Lieb et al. | |
| 2,626,943 | 1/1953 | Skeist et al. | |

EARL M. BERGERT, *Primary Examiner.*

R. A. KILLWORTH, *Assistant Examiner.*

U.S. Cl. X.R.

161—249, 269; 260—63